Patented Apr. 23, 1940

2,198,002

UNITED STATES PATENT OFFICE 2,198,002

AZO COMPOUNDS AND MATERIAL COLORED THEREWITH

Joseph B. Dickey, Rochester, N. Y., assignor to Eastman Kodak Company, Rochester, N. Y., a corporation of New Jersey No Drawing. Application August 11, 1939, Serial No. 289,693

8 Claims. (Cl. 260—165)

This invention relates to azo compounds and to fibrous organic derivatives of cellulose colored therewith. More particularly it relates to azo compounds having the general formula:

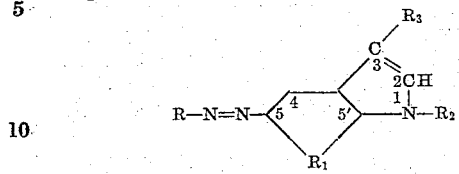

wherein R represents a benzene nucleus, $R_1$ represents a benzene nucleus joined through adjacent carbon atoms to the carbon atoms numbered 5 and 5' $R_2$ represents a member selected from the group consisting of hydrogen, an alkyl group, a hydroxyalkyl group, an alkoxyalkyl group, a sulfoalkyl group, a sulfatoalkyl group, a phosphatoalkyl group, a cyclohexyl group, a tetrahydrofurfuryl group, an aralkyl group, and a phenyl group, $R_3$ represents a member selected from the group consisting of hydrogen, and an alkyl group. The benzene nucleus, $R_1$ may carry on the other carbon atoms any monovalent substituent including among others a nitro group, a halogen, an acylamino group, a hydroxyl group, and an alkyl group.

It should be noted that while the invention is primarily concerned with the monoazo compounds, polyazo compounds are likewise included within the scope of my invention. R in the above formula, for example, may be an aromatic component containing an azo bond such as an azobenzene radical.

It is an object, therefore, of my invention to prepare the class of azo compounds above described and to color cellulose organic derivatives, particularly cellulose acetate in the form of fibres, threads, yarns and fabric materials therewith.

The azo compounds of the invention may be prepared by coupling the diazo salts of various suitable arylamines with naphthoindole coupling compounds having the general formula:

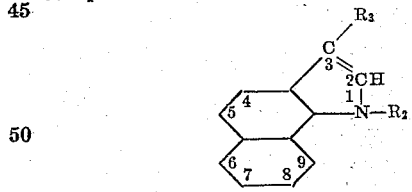

wherein $R_2$ and $R_3$ have the meanings previously defined. The above type of coupling intermediates may be obtained by following the general method described in Berichte der Deutschen Chem. Ges. 25, 2699 (1892) or by any of the other processes published in the literature.

The following examples illustrate the preparation of the azo compounds of my invention.

Example 1

1 mole of p-nitroaniline is suspended in 2000 c. cs. of water with 400 c. cs. of hydrochloric acid and diazotized at 5–15° C., with 69 grams of sodium nitrite. 1 mole of 6-hydroxy naphthoindole is dissolved in dilute hydrochloric acid, ice added, and the diazo solution slowly added. After standing for a short time, the mixture is made neutral to Congo red indicator with sodium acetate, and when the coupling reaction is complete the dye is filtered, washed and dried. Cellulose acetate is colored blue shades from aqueous suspensions of the dye.

The azo compound obtained has the formula:

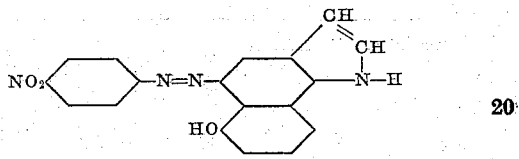

Example 2

1 mole of p-nitro-o-chloroaniline is diazotized and coupled with 1 mole of 1-β-hydroxyethyl-9-hydroxy naphthoindole in the manner described in Example 1. Cellulose acetate is colored blue shades from aqueous suspensions of the dye.

The azo compound obtained has the formula:

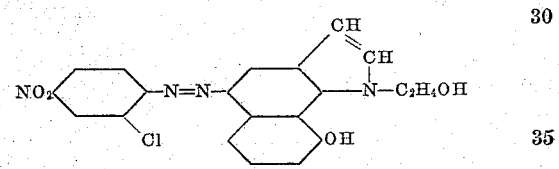

Example 3

1 mole of 2,4-dinitroaniline is dissolved in 2200 c. cs. of hot acetic acid, cooled to room temperature, and diazotized by adding a solution of 500 grams of sulphuric acid containing 69 grams of sodium nitrite and cooled to a temperature of 15° C. This solution is then slowly added to 1 mole of 1-β-sodium sulfoethyl-3-pentyl-6-hydroxy-naphthoindole dissolved in a mixture of ice and dilute hydrochloric acid, after which the mixture is made neutral to Congo red indicator with sodium acetate. When the coupling reaction is complete, the dye is filtered out, washed and dried. Cellulose acetate is colored greenish-blue shades from aqueous suspensions of the dye.

The azo compound obtained has the formula:

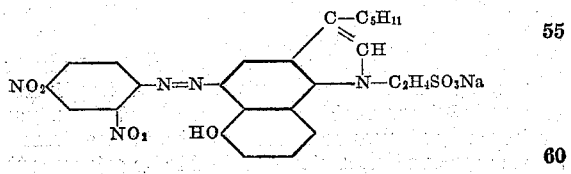

EXAMPLE 4

1 mole of 2,4-dinitro-6-chloroaniline is diazotized and copled with 1 mole of 1-β-sodium phenyl phosphatoethyl-3-methyl-6,7-dihydroxy naphthoindole following the procedure described in Example 3. Cellulose acetate is colored greenish-blue shades from aqueous suspensions of the dye.

The azo compound obtained has the formula:

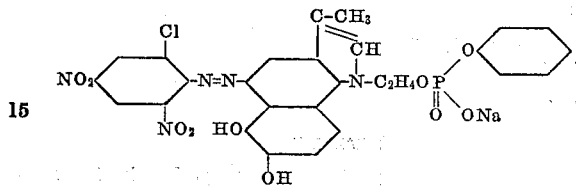

The scope of my invention will be more fully apparent by reference to the following table, wherein are shown various suitable diazotization and coupling components, the dyes resulting therefrom coloring cellulose acetate fibers the shades of color designated.

dye compound to a paste with a dispersing agent such as soap, a sulfonated oil, or a higher fatty acid glyceryl sulfate, and then dispersing the resulting paste in water. The material to be colored is immersed in the dispersion starting with a bath temperature of 45–55° C. and then gradually increasing the temperature to 80–85° C., at which point it is maintained for several hours. The exhaustion of the dye bath may be facilitated by the addition of sodium chloride during the dyeing operation. When the material has been dyed to the desired degree, it is removed from the bath, washed with soap, rinsed and dried. Where the azo compound of my invention is water-soluble the dye may be applied directly from an aqueous solution without the necessity of employing a dispersing or solubilizing agent. For a more detailed description as to how the water-soluble azo dyes of my invention may be employed for coloring fibrous materials, reference may be had to McNally & Dickey U. S. Patent No. 2,107,898, issued February 8, 1938.

Typical organic derivatives of cellulose include the hydrolyzed as well as the unhydrolyzed cellu-

Table

| Diazo component | Coupling component | Shade of color on cellulose acetate |
|---|---|---|
| o-Nitroaniline | (1) 6-hydroxy naphthoindole | Violet. |
| | (2) 6-acetamino-1, 3-dimethyl naphthoindole | Do. |
| | (3) 6-propionylamino-1, 3-dimethyl naphthoindole | Do. |
| | (4) 6-hydroxy-1-ethyl naphthoindole | Do. |
| | (5) 6-nitro-8-hydroxy-3-propyl naphthoindole | Do. |
| | (6) 9-hydroxy-1-β-hydroxyethyl-3-methyl naphthoindole | Do. |
| | (7) 4-methyl-6-hydroxy-9-methyl-1-β-hydroxyethyl naphthoindole | Do. |
| | (8) 4-methyl-6-hydroxy-9-ethyl-1-β-hydroxyethyl naphthoindole | Blue. |
| | (9) 6-hydroxy-3-methyl-1-hydroxy-propyl naphthoindole | Do. |
| | (10) 6-hydroxy-1-glyceryl-3-methyl naphthoindole | Do. |
| | (11) 6-hydroxy-7-, 9-dichloro-1-methoxyethyl-3-ethyl naphthoindole | Do. |
| | (12) 6-hydroxy-7, 9-dibromo-1-methoxyethyl-3-ethyl naphthoindole | Do. |
| | (13) 6-hydroxy-1-sulfatoethyl-3-methyl naphthoindole | Do. |
| | (14) 6-hydroxy-1-sulfoethyl-3-methyl naphthoindole | Do. |
| | (15) 6-hydroxy-1-phosphatoethyl-3-methyl napthoindole | Do. |
| | (16) Naphthoindole | Red. |
| | (17) 3-methyl naphthoindole | Do. |
| | (18) 6-propionylamino-1, 3-dimethyl naphthoindole | Do. |
| | (19) 1-β-hydroxyethyl-3-methyl naphthoindole | Do. |
| | (20) 1-γ-hydroxypropyl-4-ethyl naphthoindole | Do. |
| | (21) 1-glyceryl-4-methyl naphthoindole | Do. |
| | (22) 1-sulfatoethyl-4-methyl naphthoindole | Do. |
| | (23) 1-sulfoethyl-4-methyl naphthoindole | Do. |
| | (24) 1-β-hydroxy-β-ethoxyethyl-4-methyl naphthoindole | Do. |
| | (25) 1-benzyl naphthoindole | Do. |
| | (26) 1-tetrahydrofurfuryl-3-methyl naphthoindole | Do. |
| | (27) 1-phenyl-3-methyl naphthoindole | Do. |
| | (28) 1-cyclohexyl-3-methyl naphthoindole | Do. |
| p-Nitroaniline | Couplers 1–15 | Blue. |
| | Couplers 16–28 | Rubine. |
| p-Nitro-o-chloroaniline | Couplers 1–15 | Green-blue. |
| | Couplers 16–28 | Wine. |
| p-Nitro-o-bromo-aniline | Couplers 1–15 | Green-blue. |
| | Couplers 16–28 | Wine. |
| p-Nitro-o-fluoroaniline | Couplers 1–15 | Green-blue. |
| | Couplers 16–28 | Wine. |
| p-Nitrophenyl-o-sulfonic acid | Couplers 1–15 | Green-blue. |
| | Couplers 16–28 | Wine. |
| 2, 4-dinitroaniline | Couplers 1–15 | Blue-green. |
| | Couplers 16–28 | Violet. |
| 2, 4-dinitro-6-chloroaniline | Couplers 1–15 | Green. |
| | Couplers 16–28 | Blue. |
| 2, 4-dinitro-6-bromoaniline | Couplers 1–15 | Green. |
| | Couplers 16–28 | Blue. |
| 2, 4-dinitro-6-fluoroaniline | Couplers 1–15 | Green. |
| | Couplers 16–28 | Blue. |
| 2, 4, 6-trinitroaniline | Couplers 1–15 | Green. |
| | Couplers 16–28 | Blue-green. |
| p-Nitro-o-hydroxyaniline | Couplers 1–15 | Blue. |
| | Couplers 16–28 | Wine. |
| 6-nitro-2-aminobenzothiazole | Couplers 1–15 | Blue. |
| | Couplers 16–28 | Wine. |
| p-Aminoazobenzene | 1-β-sodium sulfatoethyl-3-methyl-6-hydroxy naphthoindole | Blue. |

Since many of the azo compounds of my invention are water-insoluble, they are ordinarily applied to organic derivatives of cellulose, particularly fibrous cellulose acetate, in the form of an aqueous suspension obtainable by grinding the lose organic acid esters such as cellulose acetate, cellulose formate, cellulose propionate, or cellulose butyrate, and the hydrolyzed as well as the unhydrolyzed mixed organic acid esters such as cellulose acetate-propionate, cellulose acetate-butyrate, and the cellulose ethers such as methyl cellulose, ethyl cellulose, or benzyl cellulose. While my invention is illustrated more particularly in connection with the coloration of cellulose acetate, a material to which the invention is especially adapted, it will be understood that it applies to the coloration of other organic derivatives of cellulose such as those just mentioned.

I claim:

1. The azo compounds having the general formula:

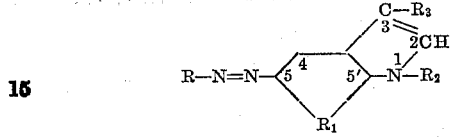

wherein R represents a benzene nucleus, $R_1$ represents a benzene nucleus joined through adjacent carbon atoms to the carbon atoms numbered 5 and 5', $R_2$ represents a member selected from the group consisting of hydrogen, an alkyl group, a hydroxyalkyl group, an alkoxyalkyl group, a sulfoalkyl group, a sulfatoalkyl group, a phosphatoalkyl group, a cyclohexyl group, a tetrahydrofurfuryl group, an aralkyl group, and a phenyl group, and $R_3$ represents a member selected from the group consisting of hydrogen, and an alkyl group.

2. The azo compounds having the general formula:

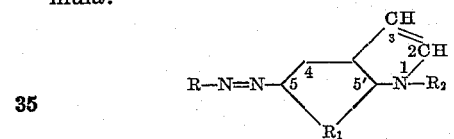

wherein R represents a benzene nucleus, $R_1$ represents a benzene nucleus joined through adjacent carbon atoms to the carbon atoms numbered 5 and 5', and $R_2$ represents a member selected from the group consisting of hydrogen, an alkyl group, a hydroxyalkyl group, an alkoxyalkyl group, a sulfoalkyl group, a sulfatoalkyl group, a phosphatoalkyl group, a cyclohexyl group, a tetrahydrofurfuryl group, an aralkyl group, and a phenyl group.

3. The azo compounds having the general formula:

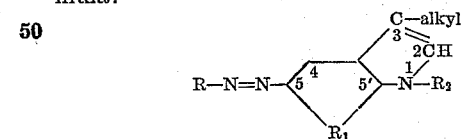

wherein R represents a benzene nucleus, $R_1$ represents a benzene nucleus joined through adjacent carbon atoms to the carbon atoms numbered 5 and 5', and $R_2$ represents a member selected from the group consisting of hydrogen, an alkyl group, a hydroxyalkyl group, an alkoxyalkyl group, a sulfoalkyl group, a sulfatoalkyl group, a phosphatoalkyl group, a cyclohexyl group, a tetrahydrofurfuryl group, an aralkyl group, and a phenyl group.

4. The azo compounds having the general formula:

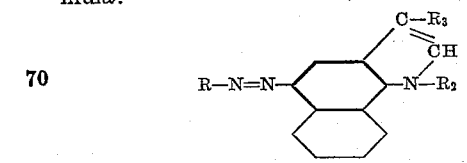

wherein R represents a benzene nucleus, $R_2$ represents a member selected from the group consisting of hydrogen, an alkyl group, a hydroxyalkyl group, an alkoxyalkyl group, a sulfoalkyl group, a sulfatoalkyl group, a phosphatoalkyl group, a cyclohexyl group, a tetrahydrofurfuryl group, an aralkyl group, and a phenyl group, and $R_3$ represents a member selected from the group consisting of hydrogen, and an alkyl group.

5. The azo compounds having the general formula:

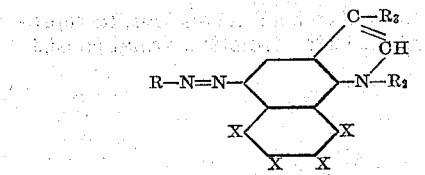

wherein R represents a benzene nucleus, $R_2$ represents a member selected from the group consisting of hydrogen, an alkyl group, a hydroxyalkyl group, an alkoxyalkyl group, a sulfoalkyl group, a sulfatoalkyl group, a phosphatoalkyl group, a cyclohexyl group, a tetrahydrofurfuryl group, an aralkyl group, and a phenyl group, $R_3$ represents a member selected from the group consisting of hydrogen, and an alkyl group, and each X represents a member selected from the group consisting of hydrogen, a hydroxyl group, a halogen, an acylamino group, and an alkyl group.

6. Material made of or containing an organic derivative of cellulose colored with a dye selected from the class of azo compounds having the general formula:

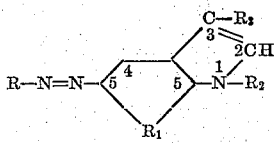

wherein R represents a benzene nucleus, $R_1$ represents a benzene nucleus joined through adjacent carbon atoms to the carbon atoms numbered 5 and 5', $R_2$ represents a member selected from the group consisting of hydrogen, an alkyl group, a hydroxyalkyl group, an alkoxyalkyl group, a sulfoalkyl group, a sulfatoalkyl group, a phosphatoalkyl group, a cyclohexyl group, a tetrahydrofurfuryl group, an aralkyl group, and a phenyl group, and $R_3$ represents a member selected from the group consisting of hydrogen, and an alkyl group.

7. Material made of or containing cellulose acetate colored with a dye selected from the class of azo compounds having the general formula:

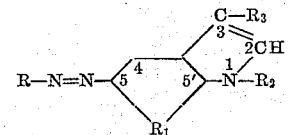

wherein R represents a benzene nucleus, $R_1$ represents a benzene nucleus joined through adjacent carbon atoms to the carbon atoms numbered 5 and 5', $R_2$ represents a member selected from the group consisting of hydrogen, an alkyl group, a hydroxyalkyl group, an alkoxyalkyl group, a sulfoalkyl group, a sulfatoalkyl group, a phosphatoalkyl group, a cyclohexyl group, a tetrahydrofurfuryl group, an aralkyl group, and a phenyl group, and $R_3$ represents a member selected from the group consisting of hydrogen, and an alkyl group.

8. Material made of or containing cellulose acetate colored with a dye selected from the class of azo compounds having the general formula:

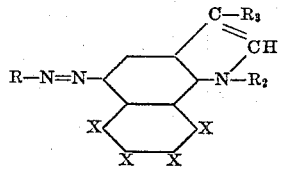

wherein R represents a benzene nucleus, $R_2$ represents a member selected from the group consisting of hydrogen, an alkyl group, a hydroxyalkyl group, an alkoxyalkyl group, a sulfoalkyl group, a sulfatoalkyl group, a phosphatoalkyl group, a cyclohexyl group, a tetrahydrofurfuryl group, an aralkyl group, and a phenyl group, $R_3$ represents a member selected from the group consisting of hydrogen, and an alkyl group, and each X represents a member selected from the group consisting of hydrogen, a hydroxyl group, a halogen, an acylamino group, and an alkyl group.

JOSEPH B. DICKEY.